3,155,699
PURIFICATION OF ISOCYANATES BY REDUCTION OF THE HYDROLYZABLE CHLORINE AND ACID CONTENT
Eugene L. Powers, New Martinsville, W. Va., assignor to Mobay Chemical Company, Pittsburgh, Pa., a corporation of Delaware
No Drawing. Filed Mar. 30, 1960, Ser. No. 18,484
7 Claims. (Cl. 260—453)

This invention relates to organic isocyanates and to a method of preparing the same and more particularly to an improved method for removing the hydrolyzable chlorine and reducing the acidity of organic isocyanates prepared by the usual methods.

It is to be understood that the term "hydrolyzable chlorine" refers to labile chlorine atoms which are loosely bound in a compound and not to a chlorine atom that is tightly chemically bound such as chlorine in chlorobenzene. This value is determined by extracting the chlorine from the isocyanate by hot solution in an aqueous-methanol solvent, or liberating the chlorine on hydrolysis of the compound with water. The extract is then subjected to a potentiometric titration of the chloride ion concentration with a standard silver nitrate solution. From the amount of silver nitrate necessary, the percentage of the hydrolyzable chlorine can be determined by a simple calculation. The term "acidity" as understood here is determined essentially in the same manner as the "hydrolyzable chlorine" content except dilute caustic is used in the titration of the free HCl or acid. From the amount of caustic used, the percent acidity as HCl can be determined.

Organic polyisocyanates are reacted with organic compounds having groups containing reactive hydrogen in the preparation of a polyurethane plastic. As disclosed by Slocombe in U.S. Patent 2,620,349, the reactivity of a chemically pure isocyanate is sometimes too great for use in these reactions. The reaction rate of the isocyanate with the reactive hydrogen atom is reduced by the presence of hydrolyzable chlorine in the isocyanate. Organic isocyanates prepared by known processes contain some hydrolyzable chlorine. Slocombe proposes to adjust the hydrolyzable chlorine content in order to predetermine the reaction rate. Any method of adjusting the hydrolyzable chlorine and acidity content usually involves initially reducing it to a very low value. The hydrolyzable chlorine and acidity have been reduced in the past by fractional distillation, but such a process is inconvenient, costly and inoperable for use when the particular isocyanate has a boiling point similar to the hydrolyzable chlorine containing material. Also, a high boiling isocyanate is difficult to distill under fractionation without high yield losses due to prolonged overheating.

It is, therefore, an object of this invention to provide an improved method for reducing the hydrolyzable chlorine and acidity content of an organic isocyanate. Another object of the invention is to provide a method of reducing the hydrolyzable chlorine and acidity content of an organic isocyanate and thereby enabling one to predetermine its reactivity with a reactive hydrogen atom which method avoids costly and inconvenient distillation steps. Still another object of the invention is to provide a method for adjusting the hydrolyzable chlorine and acidity content of an organic isocyanate which method is adapted for use either during the production of the isocyanate or after the isocyanate has been made.

The foregoing objects and others are accomplished in accordance with this invention, generally speaking, by providing a method for reducing the hydrolyzable chlorine and acidity content of an organic isocyanate wherein the organic isocyanate containing hydrolyzable chlorine and acidic compounds is admixed with ferric chloride, ferrous chloride, stannic chloride, bismuth trichloride, zinc chloride, cadmium chloride, aluminum chloride or ferric benzoate (hereinafter referred to as metal compounds) and the resulting mixture is distilled to remove the isocyanate. The invention thus contemplates a method for adjusting the hydrolyzable chlorine and acidity of an organic isocyanate to any predetermined level by first reducing it through polymerization or decomposition of the hydrolyzable chlorine and acidity compounds in the presence of one of the above mentioned metallic compounds to form a material which can be separated from the isocyanate by distillation, followed by the addition of a known hydrolyzable chlorine-bearing or compatible acidic material of predetermined acidity. The organic isocyanate and metallic compound may be mixed together in any suitable manner. For example, solid or liquid metallic compounds can be added to the organic isocyanate. The organic isocyanate can be added to the metallic compound. The metallic compound can be dissolved in a solvent therefor which is compatible with the organic isocyanate and the solution can be mixed with the organic isocyanate. The metallic compound can be added to a solution of the crude or refined isocyanate or a compatible solvent to form a slurry or solution and then introduced into a larger amount of isocyanate.

It is to be understood that the synthesis of the organic isocyanate does not form a part of this invention. The product from any method of preparing organic isocyanates which results in the final product having a hydrolyzable chlorine or acidity content may be treated by the process of this invention to remove the hydrolyzable chlorine containing substituents. As an example of a suitable method of preparing organic isocyanates, the corresponding amine or amine salts are reacted with phosgene in the manner known in the art. The following patents set forth procedures which may be used in the preparation of the organic isocyanates: 2,480,089; 2,680,127; 2,680,128; 2,733,254; 2,837,554; 2,839,559; 2,875,225. The phosgenation procedure is generally utilized in the preparation of isocyanates because of the economy of the method and the resulting superior yields obtained.

A particularly suitable method of preparing an organic isocyanate is set forth in Canadian Patent 537,484 wherein a solution of phosgene and a solution of an organic amine are introduced into a high speed mixer by separate conduits. This mixture is then fed to a reactor in which the hot-phosgenation step takes place. The solvent in which the amine and phosgene were dissolved is then removed by distillation which is generally carried out under a vacuum.

In accordance with this invention, the hydrolyzable chlorine reducing step may be conducted at any one of a number of stages in the process. For example, the metallic compound may be introduced into a solution of an organic isocyanate in a solvent immediately after the hot-phosgenation step of the procedure for preparing an isocyanate. It may also be conducted after the inert solvent has been removed from the isocyanate by a distillation step. Of course, since these further steps, such as a distillation or a number of distillation steps, generally are conducted for the purpose of purifying the organic isocyanate, the hydrolyzable chlorine content and acidity are also generally reduced to a certain extent. Therefore the amount of the metallic compound which is necessary to reduce the hydrolyzable chlorine and acidity to a minimum is dependent upon the hydrolyzable chlorine and acidity content remaining in the isocyanate at the time the mixture with the metallic compound is carried out. This invention is particularly suitable for the reason that the hydrolyzable chlorine and acidity content may be reduced at any time after the preparation of the isocyanate is completed. That is, the isocyanate may be prepared by one manufacturer and shipped to a purchaser who may then reduce the hydrolyzable chlorine and acidity content by simply stirring into the isocyanate one of the metallic compounds mentioned above and then carrying out a simple straight forward distillation.

In accordance with this invention, it has been found that certain metallic compounds will produce the desired result of reducing the hydrolyzable chlorine and acidity content of organic isocyanates. The metallic compounds which have been found operable are stannic chloride, ferric chloride, ferrous chloride, bismuth trichloride, zinc chloride, cadmium chloride, aluminum chloride and ferric benzoate. The treatment with the metallic compounds is carried out by stirring it into the hydrolyzable chlorine containing isocyanate, either in solid or liquid form, in the form of a slurry or solution in the crude or refined isocyanate, or in an inert solvent. It is preferred that the treatment with the metallic compound be carried out under anhydrous conditions since the presence of water will result in a loss of the isocyanate due to the formation of urea linkages. This procedure may be carried out at any suitable temperature, however, elevated temperatures are preferred in order to shorten the period necessary to reduce the hydrolyzable chlorine and acidity content to a minimum. The period of time for the treatment is dependent upon the temperature at which the treatment is carried out. The temperature at which the treatment with the metallic compound should take place is to a certain extent determined by the specific properties of the isocyanate being treated. That is, the treatment should be carried out below the boiling point of the isocyanate and within a range preferably between 50° C. and about 210° C. A period of time of from about 0.5 to about 6 hours is generally sufficient for the minimum hydrolyzable chlorine or acidity content to be reached. However, the hydrolyzable chlorine and acidity content is reduced to some degree even when the isocyanate is distilled immediately after the metallic compound is added. After this treatment, the material including the isocyanate, the metallic compound and the hydrolyzable chlorine and acidic materials, is distilled generally under vacuum to remove the organic isocyanate from the residue of hydrolyzable chlorine and acidic containing substituents.

As stated previously, the quantity of the particular metallic compound used for treating the organic isocyanates depends on the amount of hydrolyzable chlorine and acidic containing substituents present in the particular isocyanate. However, an amount from about 0.01 to about 2 mol percent of any of the materials set forth above is usually sufficient to reduce the hydrolyzable chlorine and acidic content. Of the materials set forth above it has been found generally that the iron containing compounds are the most suitable for the reason that smaller quantities are required and shorter treatment periods are necessary to reduce the hydrolyzable chlorine and acidity to a given percentage. Ferric chloride has been found to be the most effective compound and it is therefore preferred. The quantity of ferric chloride preferred is from about 0.1 to about 0.8 mol percent. Larger quantities of ferric chloride of course may be used, however, no further reduction in the hydrolyzable chlorine or acidity content has been noted. Therefore, for economic reasons the lower quantities are preferred.

The method of the instant invention is applicable to the production of aliphatic, cycloaliphatic, alkaryl, heterocyclic and aryl mono-, di- and polyisocyanates. Illustrative examples of these are hexyl isocyanate, octyl isocyanate, dodecyl isocyanate, octadecyl isocyanate, ethylene diisocyanate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, etc.; cyclohexyl isocyanate, tetra-alpha-naphthyl isocyanate, tetrahydro-beta-naphthyl isocyanate, etc.; cyclopentylene-1,3-diisocyanate, cyclohexylene-1,4-diisocyanate, toluene isocyanate, p-ethylphenyl isocyanate, 2,4-toluylene diisocyanate, 2,6-toluylene diisocyanate and mixtures of 2,4- and 2,6-toluylene diisocyanate, xylylene-1,4-diisocyanate, xylylene-1,3-diisocyanate, 4,4'-diphenylmethane diisocyanate, 4,4'-diphenyl propane diisocyanate, etc.; benzyl isocanyate, phenylethyl isocyanate, p-isocyanato benzyl isocyanate, etc.; phenyl isocyanate, chlorophenyl isocyanate, p-cetylphenyl isocyanate, p-dodecylphenyl isocyanate, 4-dodecyl-2-methyl-phenyl isocyanate, 3-nitro-4-dodecyl phenyl isocyanate, p-cetyloxyphenyl isocyanate, m-phenylene diisocyanate, p-phenylene diisocyanate, naphthylene 1,4-diisocyanate, naphthylene 1,5-diisocyanate, 1,2,4-benzene triisocyanate, etc.; furfuryl isocyanate, tetrahydrofurfuryl isocyanate, furfurylidene diisocyanate, etc.; p,p',p''-triphenyl methane triisocyanate, diphenyl-4,6,4'-triisocyanate and the like. The particular metallic compound used must be selected with its boiling point and that of the isocyanate sufficiently different to permit separation by a simple distillation.

It is again pointed out for the purpose of clarity that this invention is not limited to particular percentages, temperatures and periods of time for which this reaction is to take place for the reason that these variables are dependent upon the condition of the isocyanate when treated in the manner specified herein. If the isocyanate is treated immediately after removal from the hot-phosgenation step in the preparation of the isocyanate, at least one of the variables, that is, the period of time, the quantity of the metallic compound used, or the temperature will exceed that necessary to lower the hydrolyzable chlorine and acidity content of an isocyanate sample which has been twice distilled. That is, to lower the hydrolyzable chlorine and acidity content to a given percentage, more of the metallic compound would be required in a crude isocyanate than in a refined isocyanate.

Organic isocyanates treated in accordance with this invention are useful in the preparation of cellular polyurethane materials as well as elastomeric materials. Cellular polyurethanes are useful for manufacturing cushions, pillows, upholstering units of all types and for sound and weather insulation purposes. Elastomeric polyurethanes are useful for the manufacture of vehicle tires, gears, shaft couplings, diaphragms, and many other applications.

The invention may be further illustrated by the following examples in which parts are given by weight unless otherwise specified.

*Example 1*

A solution of 2,4-tolylene diamine in O-dichlorobenzene having a concentration of about 15 parts amine to about 285 parts solvent is intimately admixed with liquid phosgene which is at a temperature of about 0° C. The temperature of the tolylene diamine solution prior to mixing is about 75° C. The reaction mixture is then heated to a temperature of about 150° C. for about 3 hours while adding an excess of phosgene. Residual phosgene is next removed by passing nitrogen into the solution. The solvent is then removed by distillation. The yield of 2,4-tolylene diisocyanate is from about 96 percent to about 98 percent of theoretical and has a hydrolyzable chlorine content of about 0.06 percent.

The previous example illustrates one method of preparing tolylene diisocyanate from its corresponding diamine. No particular steps were taken to control or reduce the hydrolyzable chlorine content of the material.

Examples 2 through 15 are conducted in accordance with the following procedure.

The 2,4-tolylene diisocyanate reaction product of Example 1 is introduced in a vessel equipped with an agitating device. The metallic compound is then introduced in the form of a slurry in the 2,4-tolylene diisocyanate and the entire mixture stirred and heated. The tolylene diisocyanate is then removed by vacuum distillation. The conditions of the treatment and results of these examples are set forth in the following table.

| Example No. | Treating compound | Time of treatment, hours | Temperature, °C. | Mol percent of treating compound added | Hydrolyzable chlorine content, percent |
|---|---|---|---|---|---|
| 2 | None (control). | 4 | 140 | -------- | 0.06 |
| 3 | FeCl₃ | 4 | 140 | 0.019 | 0.013 |
| 4 | FeCl₃ | 5 | 140 | 0.021 | 0.015 |
| 5 | FeCl₃ | 1 | 110 | 0.021 | 0.022 |
| 6 | FeCl₃ | 4 | 140 | 0.054 | 0.006 |
| 7 | FeCl₃ | 0 | (¹) | 0.11 | 0.019 |
| 8 | FeCl₃ | 1 | 110 | 0.11 | 0.012 |
| 9 | FeCl₃ | 2 | 110 | 0.11 | 0.012 |
| 10 | FeCl₃ | 4 | 110 | 0.11 | 0.014 |
| 11 | FeCl₃ | 4 | 140 | 0.11 | 0.005 |
| 12 | FeCl₃ | 4 | 140 | 0.16 | 0.001 |
| 13 | FeCl₃ | 2 | 140 | 0.18 | 0.002 |
| 14 | FeCl₃ | 4 | 140 | 0.18 | 0.002 |
| 15 | FeCl₂ | 4 | 150 | 0.15 | <0.001 |

¹ Distilled at 96° C.

It will be noted from Example 2 that the labile chlorine content is not reduced merely by maintaining the isocyanate at elevated temperatures for a period of time.

It will be noted from Examples 3 through 15 that the iron chlorides produce a most advantageous effect in reducing the hydrolyzable chlorine content. For instance, in Example 7 the tolylene diisocyanate was removed by distillation under reduced pressure immediately after introducing ferric chloride, with a resulting reduction in the hydrolyzable chlorine content.

The reduction of the hydrolyzable chlorine content of a sample of tolylene diisocyanate originally containing 0.036 percent hydrolyzable chlorine after redistillation is illustrated in the following table.

| Example No. | Treating compound | Time of treatment, hours | Temperature, °C. | Mol percent of treating compound added | Hydrolyzable chlorine content, percent |
|---|---|---|---|---|---|
| 16 | FeCl₃ | 4 | 150 | 0.15 | 0.003 |
| 17 | SnCl₄ | 4 | 150 | 0.15 | 0.019 |
| 18 | SnCl₄ | 4 | 150 | 0.50 | 0.010 |
| 19 | SnCl₄ | 4 | 150 | 1.0 | <0.001 |

A sample of 2,4-tolylene diisocyanate prepared in the manner set forth above and having a hydrolyzable chlorine content of 0.027 percent is treated in accordance with the conditions set out in the following table. The effect of these compounds on the hydrolyzable chlorine content is readily apparent from the table.

| Example No. | Treating compound | Time of treatment, hours | Temperature, °C. | Mol percent of treating compound added | Hydrolyzable chlorine content, percent |
|---|---|---|---|---|---|
| 20 | BiCl₃ | 6 | 180 | 1.0 | 0.001 |
| 21 | Ferric benzoate. | 6 | 175 | 0.1 | <0.001 |
| 22 | ZnCl₂ | 5 | 210 | 1.0 | 0.005 |
| 23 | CdCl₂ | 4 | 210 | 1.0 | 0.013 |
| 24 | AlCl₃ | 6 | 175 | 1.0 | 0.001 |
| 25 | FeCl₂ | 6 | 175 | 1.0 | 0.007 |
| 26 | FeCl₂ | 6 | 175 | 0.3 | 0.015 |

A sample of crude 4,4′-diphenylmethane diisocyanate prepared by the phosgenation of 4,4′-diphenylmethane diamine has a hydrolyzable chlorine content of 0.019 percent. This diisocyanate is then admixed with the mol percentage of ferric chloride set forth in the immediately following table and the mixture is agitated for the time specified at the temperature specified in the table. In all cases the hydrolyzable chlorine content which was obtained after a simple distillation step is found to be drastically reduced.

| Example No. | Time of treatment, hours | Temperature, °C. | Mol percent of ferric chloride | Hydrolyzable chlorine, percent | Acidity, percent |
|---|---|---|---|---|---|
| 27 | 0.5 | 50 | 0.77 | 0.006 | -------- |
| 28 | 0.5 | 100 | 0.77 | 0.004 | -------- |
| 29 | 1 | 50 | 0.77 | 0.006 | -------- |
| 30 | 1 | 100 | 0.77 | 0.007 | -------- |
| 31 | 1 | 100 | 5.9 | 0.005 | -------- |
| 32 | 2.5 | 100 | 0.37 | 0.004 | <0.001 |
| 33 | 1 | 120 | 0.31 | 0.001 | 0.001 |

Of course, it is to be understood that any of the previously mentioned isocyanates may be treated in the manner set forth in the examples and that the invention is not to be limited to only the particular isocyanates set forth in the examples. Further, any of the materials set forth previously as the treating compound may be substituted into the examples to reduce the hydrolyzable chlorine content.

Although the invention has been described in considerable detail for the purpose of illustration, it is to be understood that variations may be made therein by those skilled in the art without departing from the spirit of the invention and the scope of the claims.

What is claimed is:

1. A method of reducing the hydrolyzable chlorine and acidic constituents of an organic isocyanate substantially free of chemically bonded chlorine and containing hydrolyzable chlorine and acidic constituents as an impurity therewith, which comprises treating said organic isocyanate mixtures with from 0.01 to 2 mol percent, based on said isocyanate, of a metallic compound selected from the group consisting of ferric chloride, ferrous chloride, stannic chloride, bismuth trichloride, zinc chloride, cadmium chloride, aluminum chloride, and ferric benzoate, and recovering the purified isocyanate from the resulting mixture.

2. A method of reducing the hydrolyzable chlorine and acidic constituents of an organic isocyanate substantially free of aliphatically bonded chlorine and containing said hydrolyzable chlorine and acidic constituents as an impurity therewith which comprises heating said organic isocyanate mixture at a temperature below the boiling point of said organic isocyanate with from 0.01 to 2 mol percent, based on said isocyanate, of a metallic compound selected from the group consisting of ferric chloride, ferrous chloride, stannic chloride, bismuth trichloride, zinc chloride, cadmium chloride, aluminum chloride, and ferric benzoate, and recovering the purified isocyanate from the resulting mixture.

3. The method of claim 2 in which the metallic compound is ferric chloride.

4. The method of claim 2 in which the metallic compound is ferrous chloride.

5. The method of claim 2 in which the metallic compound is ferric benzoate.

6. The method of claim 2 in which the organic isocyanate is 4,4′ diphenyl methane diisocyanate.

7. The method of claim 2 in which the organic isocyanate is tolylene diisocyanate.

References Cited in the file of this patent

UNITED STATES PATENTS

| | | |
|---|---|---|
| 2,768,181 | Bellin | Oct. 23, 1956 |
| 2,810,711 | Holtschmidt et al. | Oct. 22, 1957 |
| 2,915,545 | Tazuma | Dec. 1, 1959 |
| 2,969,386 | McElroy | Jan. 24, 1961 |

OTHER REFERENCES

Remy: Treatise on Inorganic Chemistry, vol. II, pages 282–283 (1956).